(12) United States Patent
Taguchi

(10) Patent No.: US 12,528,467 B2
(45) Date of Patent: Jan. 20, 2026

(54) TRAVELING CONTROL APPARATUS

(71) Applicant: SUBARU CORPORATION, Tokyo (JP)

(72) Inventor: Noriaki Taguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 259 days.

(21) Appl. No.: 17/947,749

(22) Filed: Sep. 19, 2022

(65) Prior Publication Data

US 2023/0096882 A1     Mar. 30, 2023

(30) Foreign Application Priority Data

Sep. 29, 2021   (JP) ................................. 2021-159666

(51) Int. Cl.
*B60W 30/165*     (2020.01)
*B60W 10/20*     (2006.01)

(52) U.S. Cl.
CPC .......... *B60W 30/165* (2013.01); *B60W 10/20* (2013.01); *B60W 2554/4041* (2020.02); *B60W 2554/802* (2020.02)

(58) Field of Classification Search
CPC .............. B60W 30/165; B60W 10/20; B60W 2554/4041; B60W 2554/802
USPC ........................................................ 701/96
See application file for complete search history.

(56) References Cited

U.S. PATENT DOCUMENTS

| | | | | |
|---|---|---|---|---|
| 2011/0106391 A1* | 5/2011 | Shida | .................... | B60W 30/16 701/96 |
| 2014/0180569 A1* | 6/2014 | Ueda | ............... | B60W 30/18163 701/400 |
| 2015/0100228 A1 | 4/2015 | Sudou et al. | | |
| 2018/0065630 A1 | 3/2018 | Tamura | | |
| 2020/0055495 A1* | 2/2020 | Takaki | ..................... | B60T 8/17 |
| 2022/0410883 A1* | 12/2022 | Oh | .................... | B60W 50/0097 |

FOREIGN PATENT DOCUMENTS

| | | | | |
|---|---|---|---|---|
| EP | 3882096 A1 * | 9/2021 | .......... | B60W 30/143 |
| JP | 2015-71361 A | 4/2015 | | |
| JP | 2018-039284 A | 3/2018 | | |

OTHER PUBLICATIONS

Yimin Chen, Trajectory Tracking Control for Autonomous Vehicles in Different Cut-in Scenarios, Jul. 12, 2019, IEEE, 2019 American Control Conference (ACC) (Year: 2019).*
Office Action dated Jul. 1, 2025 in Japanese Patent Application No. 2021-159666 (including English translation).

* cited by examiner

*Primary Examiner* — Matthias S Weisfeld
(74) *Attorney, Agent, or Firm* — TROUTMAN PEPPER LOCKE LLP

(57) ABSTRACT

A traveling control apparatus to be applied to a vehicle includes at least one processor that is configured to function as a driving assistance controller. In a case where a preceding vehicle traveling ahead of the vehicle changes from a pre-switching preceding vehicle to a post-switching preceding vehicle, the driving assistance controller is configured to set a control target point in such a way that an object to be tracked is switched stepwise from the pre-switching preceding vehicle to the post-switching preceding vehicle. The driving assistance controller is configured to cause steering control to be performed in such a way that the vehicle tracks the set control target point.

8 Claims, 5 Drawing Sheets

TRAVELING CONTROL APPARATUS

CROSS-REFERENCE TO RELATED APPLICATION

The present application claims priority from Japanese Patent Application No. 2021-159666 filed on Sep. 29, 2021, the entire contents of which are hereby incorporated by reference.

BACKGROUND

The disclosure relates to a traveling control apparatus mounted on a vehicle.

Traveling control apparatuses mounted on a vehicle, such as an automobile, have been known. For example, such a traveling control apparatus is configured to detect objects that are present ahead of a vehicle (first vehicle) having the traveling control apparatus thereon by using a radar, select from the detected objects a preceding vehicle to be tracked by the first vehicle, and enable the first vehicle to track the selected preceding vehicle (see, e.g., Japanese Unexamined Patent Application Publication No. 2015-71361).

SUMMARY

An aspect of the disclosure provides a traveling control apparatus. The traveling control apparatus includes at least one processor. The at least one processor is configured to function as a driving assistance controller. In a case where a preceding vehicle traveling ahead of the vehicle changes from a pre-switching preceding vehicle to a post-switching preceding vehicle, the driving assistance controller is configured to set a control target point in such a way that an object to be tracked is switched stepwise from the pre-switching preceding vehicle to the post-switching preceding vehicle. The driving assistance controller is configured to cause steering control to be performed in such a way that vehicle tracks the set control target point.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

For example, if a vehicle cuts in between the preceding vehicle and the first vehicle having the traveling control apparatus mounted thereon, the traveling control apparatus determines that the vehicle that has cut in is a new preceding vehicle to be tracked. In this case, if steering control is performed in such a way that the first vehicle tracks the preceding vehicle that has cut in, the behavior of the first vehicle may become unstable because of, for example, an unintended change in steering direction.

Accordingly, it is desirable to provide a traveling control apparatus that can stabilize the behavior of a vehicle having the traveling control apparatus mounted thereon.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
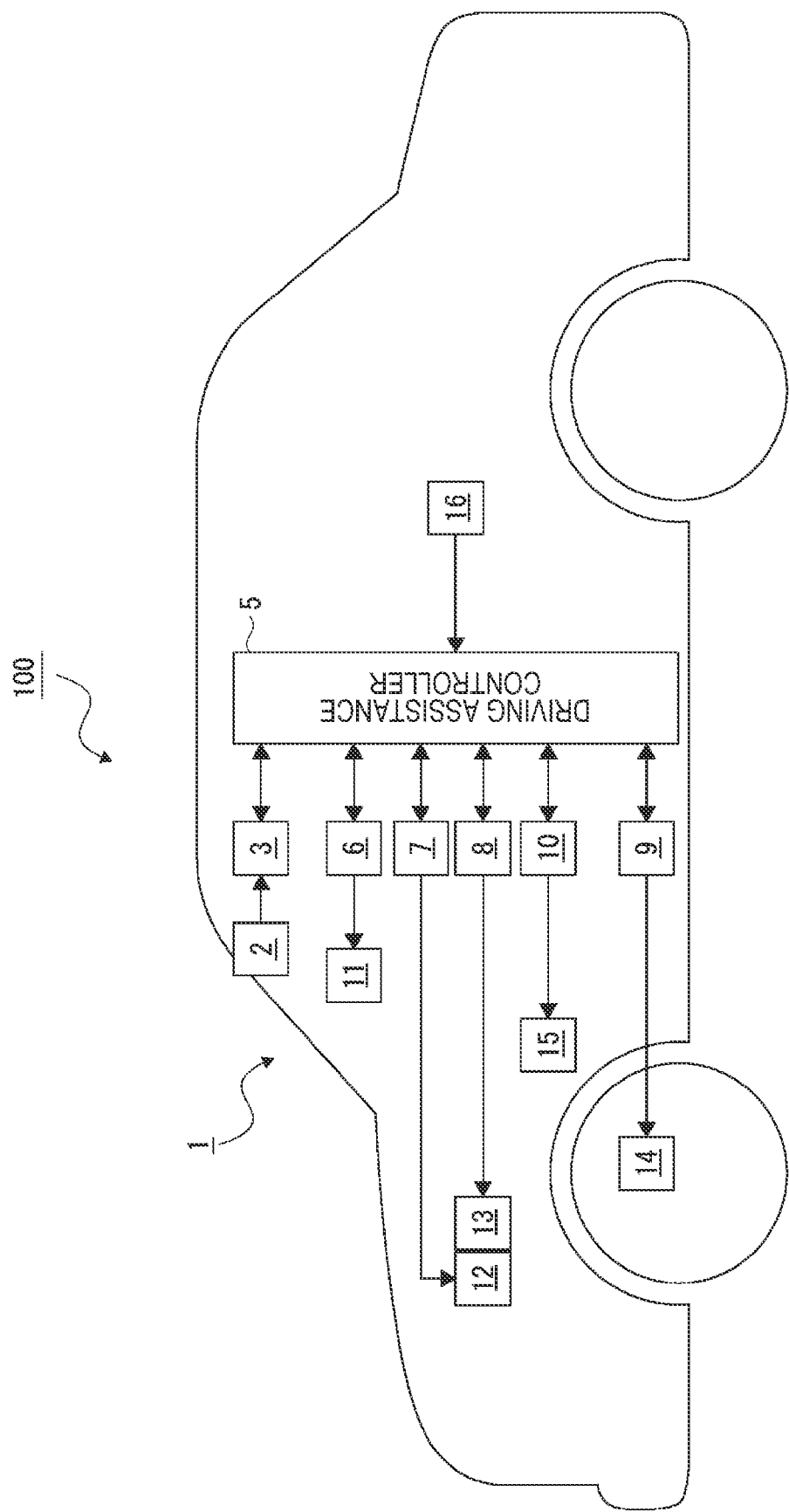
FIG. 1 is a diagram illustrating a vehicle equipped with a traveling control apparatus according to an embodiment of the disclosure.
Figure 2:
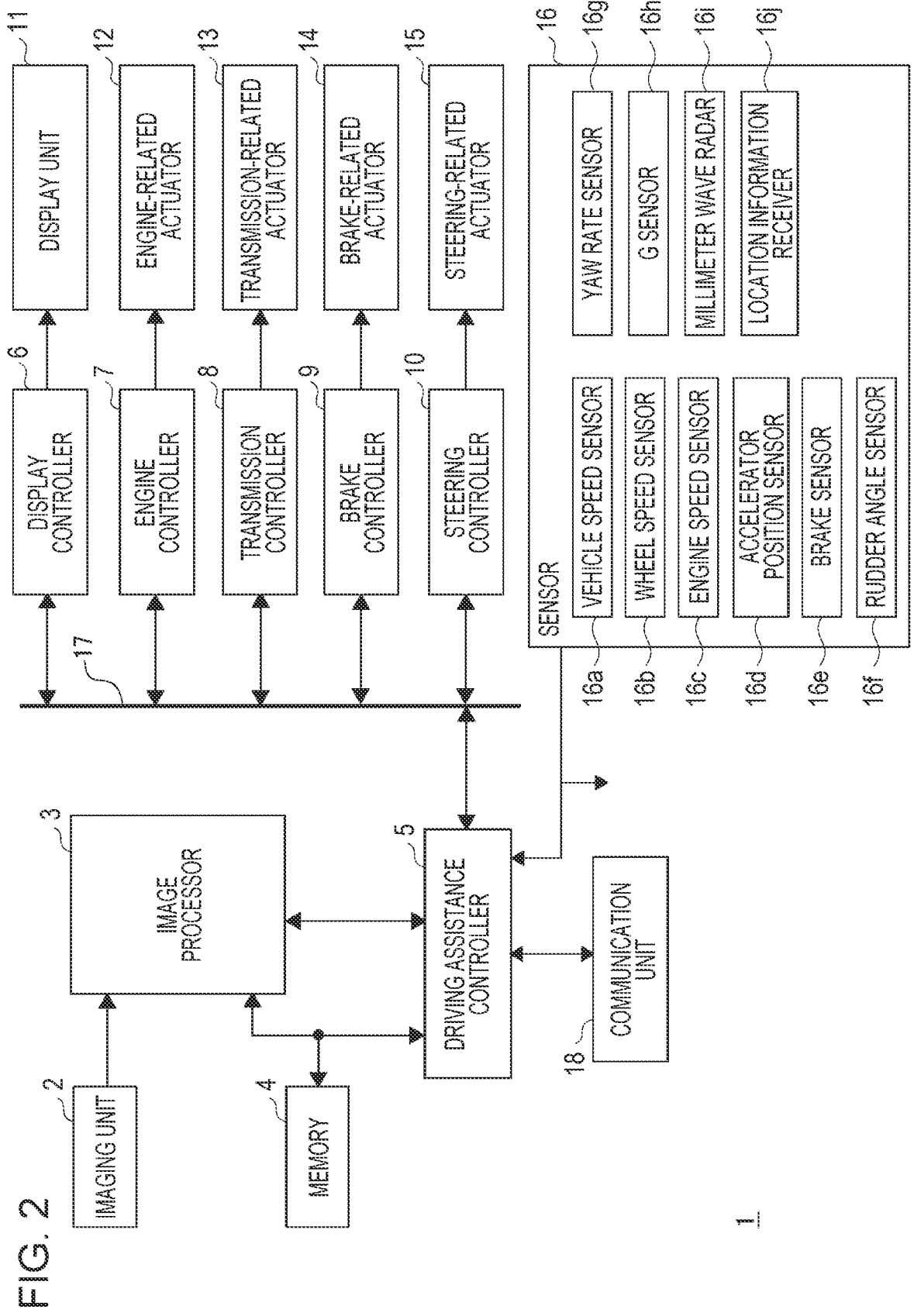
FIG. 2 is a diagram illustrating a configuration of the traveling control apparatus.

FIG. 1 is a diagram illustrating a vehicle 100 equipped with a traveling control apparatus 1. FIG. 2 is a diagram illustrating a configuration of the traveling control apparatus 1. As illustrated in FIG. 1, the traveling control apparatus 1 is mounted on the vehicle 100 and controls the traveling of the vehicle 100.

FIG. 1 illustrates a part of the traveling control apparatus 1, which actually includes other components as well.

As illustrated in FIG. 2, the traveling control apparatus 1 includes an imaging unit 2, an image processor 3, a memory 4, a driving assistance controller 5, a display controller 6, an engine controller 7, a transmission controller 8, a brake controller 9, a steering controller 10, a display unit 11, an engine-related actuator 12, a transmission-related actuator 13, a brake-related actuator 14, a steering-related actuator 15, a sensor 16, a bus 17, and a communication unit 18.

The driving assistance controller 5, the display controller 6, the engine controller 7, the transmission controller 8, the brake controller 9, and the steering controller 10 are coupled to each other via the bus 17.

The image processor 3 is constituted by a microcomputer that includes, for example, a central processing unit (CPU) (processor), a read-only memory (ROM), and a random-access memory (RAM). The image processor 3 executes predetermined image processing related to recognition of an environment outside the vehicle 100, on the basis of image data acquired from the imaging unit 2 which has captured an image of a region in the direction of travel of the vehicle 100 (ahead of the vehicle 100 in this example) and an image of a region lateral to the vehicle 100. The image processor 3 performs the image processing by using the memory 4 including, for example, a nonvolatile memory.

The imaging unit 2 is constituted, for example, by a stereo camera including two cameras that are configured to capture images in substantially the same direction. The cameras each include a camera optical system and an imaging element, such as a charge-coupled device (CCD) or a complementary metal-oxide semiconductor (CMOS). The camera optical system forms a subject image on an imaging surface of the imaging element and generates an electric signal on a pixel-by-pixel basis in accordance with the amount of received light.

Each camera is installed in such a way as to be capable of measuring distances by a so-called stereo imaging technique. The electric signal generated by each camera is subjected to analog-to-digital (A/D) conversion and predetermined correction processing and supplied, to the image processor 3, as a digital image signal (image data) that represents a brightness value in a predetermined shade of gray on a pixel-by-pixel basis.

The imaging unit 2 may be constituted by a single camera including an imaging element that is capable of measuring distances. The imaging unit 2 may be constituted by a camera configured to capture an image of a region ahead of the vehicle 100, a camera configured to capture an image of a region behind the vehicle 100, and a camera configured to capture an image of a region lateral to the vehicle 100.

The image processor 3 executes various types of image processing based on image data acquired by stereo imaging, recognizes forward information, such as information about three-dimensional objects and traffic lines (e.g., center and lane lines) ahead of the vehicle 100, and recognizes the road and lane (vehicle travel path) in which the vehicle 100 is traveling on the basis of the recognized information. The image processor 3 also recognizes a preceding vehicle to be tracked on the basis of, for example, the recognized three-dimensional objects.

For example, the image processor 3 performs the following processing as processing that is based on image data obtained by stereo imaging. First, for a pair of images captured as image data, the image processor 3 generates distance information for each pixel from the amount of displacement (parallax) between the corresponding positions by using the principles of triangulation. The image processor 3 then performs a known grouping process on the distance information, and compares the resulting grouped distance information to, for example, three-dimensional road shape data and three-dimensional object data stored in advance, so as to recognize lane lines, guardrails and side walls, such as curbs, along the road, three-dimensional objects, such as vehicles, stop lines, traffic lights, railroad crossings, pedestrian crossings, and lanes.

If the overlapping ratio of a recognized vehicle located ahead is greater than or equal to a predetermined value, the image processor 3 recognizes the vehicle as a preceding vehicle. The overlapping ratio represents the degree to which the lateral position of the vehicle 100 overlaps the lateral position of the vehicle ahead of the vehicle 100. The overlapping ratio is 100% when the vehicle ahead of the vehicle 100 completely overlaps the vehicle 100, the overlapping ratio is 50% when half the lateral width of one vehicle body overlaps that of the other, and the overlapping ratio is 0% when the lateral width of one vehicle body does not overlap that of the other.

The image processor 3 can thus recognize a nearby object and its behavior on the basis of an image captured by the imaging unit 2. For example, the image processor 3 can recognize the position, speed, and acceleration (positive or negative acceleration depending on the increase or decrease in speed) of the preceding vehicle with respect to the vehicle 100, a change in the direction of travel of the preceding vehicle, and flashing of a direction indicator of the preceding vehicle.

For example, the image processor 3 recognizes various types of external environment information, such as those described above, for each frame of image data, and sequentially stores (retains) the recognized information in the memory 4.

The driving assistance controller 5 is constituted by a microcomputer that includes, for example, a CPU, a ROM, and a RAM. The driving assistance controller 5 executes various types of driving assistance control for driving assistance on the basis of, for example, a result of image processing performed by the image processor 3 and retained in the memory 4, a detection signal obtained by the sensor 16, operation input information, and communication information of the communication unit 18.

The driving assistance controller 5 is coupled via the bus 17 to the display controller 6, the engine controller 7, the transmission controller 8, the brake controller 9, and the steering controller 10 each also constituted by a microcomputer. The driving assistance controller 5 can perform data communication with each of the controllers described above. The driving assistance controller 5 appropriately instructs the controllers to execute a necessary operation related to driving assistance.

Examples of possible driving assistance control executed by the driving assistance controller 5 include lane keeping control, collision mitigation braking control (autonomous emergency braking (AEB)), inter-vehicle distance control (adaptive cruise control (ACC)), and steering control for tracking a preceding vehicle (hereinafter referred to as preceding-vehicle tracking steering control). Note that the description of lane keeping control, collision mitigation braking control, and inter-vehicle distance control, which can be performed by known techniques, is omitted. The preceding-vehicle tracking steering control will be described in detail later on below.

The display controller 6 controls a display operation of the display unit 11 on the basis of, for example, a detection signal from the sensor 16, operation input information from an operation unit, or an instruction from the driving assistance controller 5. For example, on the basis of an instruction from the driving assistance controller 5, the display controller 6 can display a predetermined alert message in the display unit 11 as part of the driving assistance.

The display unit 11 collectively refers to various meters, such as a speedometer and a tachometer, on a meter panel installed in front of the driver, a multifunction display (MFD), and a display device for providing information to the driver. The MFD is capable of displaying various types of information, such as the total traveling distance of the vehicle 100, outside air temperature, and instantaneous fuel economy, simultaneously or in a switching manner.

The engine controller 7 controls various actuators provided as the engine-related actuator 12, on the basis of, for example, a detection signal from the sensor 16, operation input information from the operation unit, or an instruction from the driving assistance controller 5.

As the engine-related actuator 12, various actuators related to engine drive, such as a throttle actuator for driving a throttle valve and an injector that performs fuel injection, are provided.

For example, the engine controller 7 performs control to start and stop the engine in response to the operation of an ignition switch. Also, the engine controller 7 controls, for example, fuel injection timing, fuel injection pulse width, and throttle position on the basis of a detection signal from a predetermined sensor, such as an engine speed sensor 16c or an accelerator position sensor 16d (described below).

Also, on the basis of a necessary torque calculated by the driving assistance controller 5 on the basis of a target acceleration and output, as well as the transmission gear ratio of the transmission, the engine controller 7 determines a target throttle position from, for example, a map and controls the throttle actuator (i.e., performs engine output control) on the basis of the determined throttle position.

The transmission controller 8 controls various actuators provided as the transmission-related actuator 13 on the basis of, for example, a detection signal from the sensor 16, operation input information from the operation unit, or an instruction from the driving assistance controller 5.

As the transmission-related actuator 13, for example, an actuator for variable-speed control of an automatic transmission is provided.

For example, the transmission controller 8 outputs a predetermined variable-speed signal to the transmission-related actuator 13 to perform variable-speed control.

When the automatic transmission is a continuously variable transmission (CVT), the variable-speed control involves continuously changing the transmission gear ratio.

The brake controller 9 controls various actuators provided as the brake-related actuator 14 on the basis of, for example, a detection signal from the sensor 16, operation input information from the operation unit, or an instruction from the driving assistance controller 5.

As the brake-related actuator 14, various brake-related actuators, such as hydraulic control actuators for controlling the hydraulic pressure output from a brake booster to a master cylinder and the hydraulic pressure in a brake fluid pipe, are provided.

For example, on the basis of hydraulic pressure instruction information output from the driving assistance controller 5, the brake controller 9 controls a hydraulic control actuator to apply brakes to the vehicle 100. The brake controller 9 calculates the slip ratio of wheels on the basis of a detection signal from a predetermined sensor (e.g., rotation speed sensor on the axle or a vehicle speed sensor 16*a*), and causes the hydraulic control actuator to increase or decrease the hydraulic pressure in accordance with the slip ratio to achieve so-called antilock brake system (ABS) control.

The steering controller 10 controls various actuators provided as the steering-related actuator 15, on the basis of a detection signal from the sensor 16, operation input information from the operation unit, or an instruction from the driving assistance controller 5.

As the steering-related actuator 15, for example, an actuator for turning the steering wheels, such as front wheels, is provided.

For example, the steering controller 10 turns the steering wheels by controlling the steering-related actuator 15 on the basis of a steering angle detected by a rudder angle sensor 16*f* (described below). The steering controller 10 achieves automatic steering by controlling the steering-related actuator 15 on the basis of instruction information received from the driving assistance controller 5.

The sensor 16 collectively refers to various sensors mounted on the vehicle 100. Examples of the sensor 16 include, but are not limited to, the vehicle speed sensor 16*a*, a wheel speed sensor 16*b*, the engine speed sensor 16*c*, the accelerator position sensor 16*d*, a brake sensor 16*e*, the rudder angle sensor 16*f*, a yaw rate sensor 16*g*, a G sensor (acceleration sensor) 16*h*, a millimeter wave radar 16*i*, and a location information receiver 16*j*.

The vehicle speed sensor 16*a* detects the speed of the vehicle 100.

The wheel speed sensor 16*b* detects the rotation speed of the wheels.

The engine speed sensor 16*c* detects the engine speed.

The accelerator position sensor 16*d* detects the accelerator position from the degree of depression of the accelerator pedal.

The brake sensor 16*e* detects the amount of brake operation from the degree of depression of the brake pedal.

The rudder angle sensor 16*f* detects the steering angle of the steering wheel.

The yaw rate sensor 16*g* detects a yaw rate applied to the vehicle 100.

The G sensor 16*h* detects the direction of travel of the vehicle 100, the vehicle width direction, and acceleration acting in the vertical direction.

The millimeter wave radar 16*i* detects surrounding conditions by means of sensing through outward emission of millimeter waves.

The location information receiver 16*j* is, for example, a global navigation satellite system (GNSS) receiver or a receiver that receives information from a roadside unit, and acquires current location information.

Various detection signals from the sensor 16 are appropriately supplied to the image processor 3, the driving assistance controller 5, the display controller 6, the engine controller 7, the transmission controller 8, the brake controller 9, and the steering controller 10.

The communication unit 18 performs inter-vehicle communication and network communication with an external device, such as a server, and receives a GNSS signal. For example, the driving assistance controller 5 can acquire information about another vehicle received by the communication unit 18. The communication unit 18 can also acquire various types of information, such as surrounding environment information and road information of the current location, through network communication, such as the Internet.

Preceding-vehicle tracking steering control according to an embodiment will be described.

Hereinafter, a vehicle traveling ahead of the vehicle 100, which has the traveling control apparatus 1 mounted thereon, will be referred to as a preceding vehicle 200.

If lane keeping control cannot be performed because the image processor 3 fails to identify the lane in which the vehicle 100 is traveling during execution of ACC, the driving assistance controller 5 performs preceding-vehicle tracking steering control instead of lane keeping control. Execution of preceding-vehicle tracking steering control may take place when ACC is not being executed, or may be prioritized over lane keeping control during execution of ACC.

Preceding-vehicle tracking steering control according to a comparative example will be described first, and this will be followed by description of the process of preceding-vehicle tracking steering control according to the embodiment. In the comparative example and the embodiment, the preceding-vehicle tracking steering control is executed every time the imaging unit 2 captures an image and the image processor 3 performs image processing. The execution takes place at intervals of processing time t. That is, preceding-vehicle tracking steering control is executed every processing time t.

Figure 3:
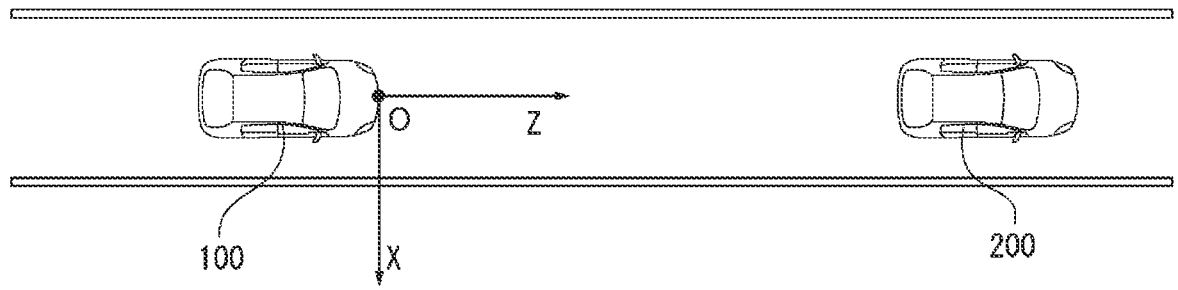
FIG. 3 is a diagram illustrating an overview of preceding-vehicle tracking steering control.
Figure 4:
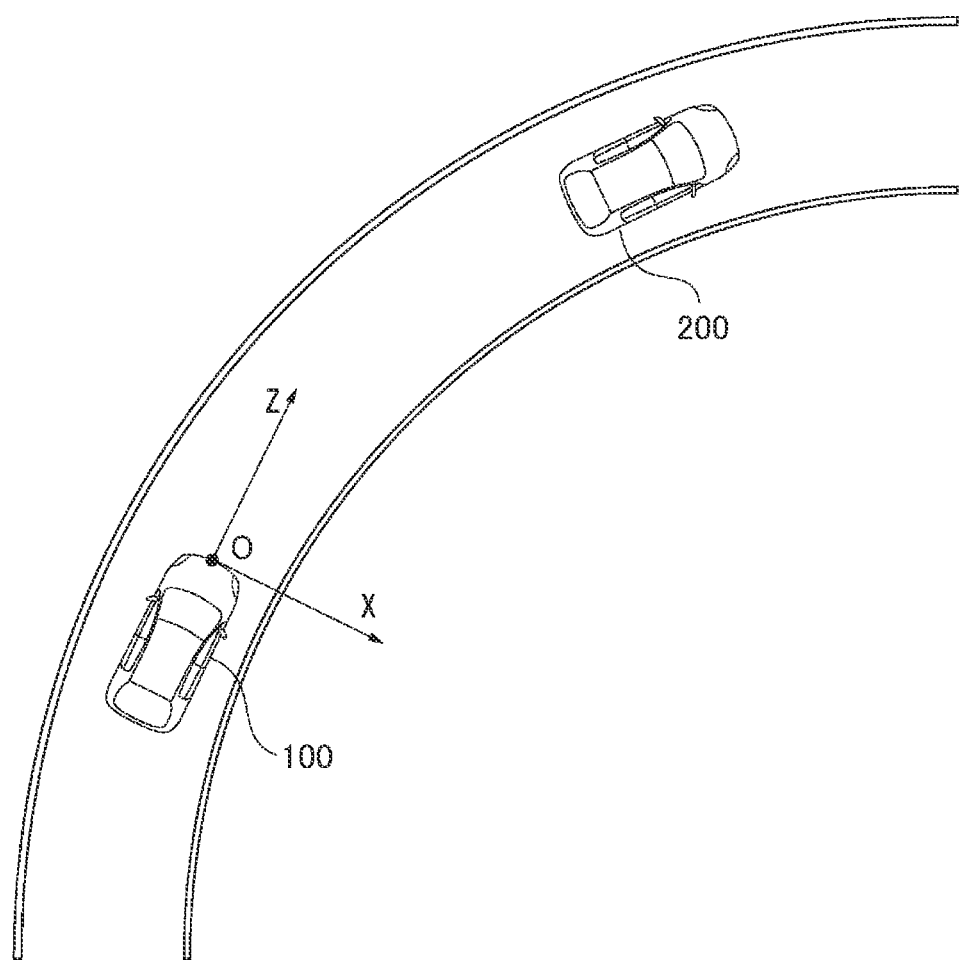
FIG. 4 is a diagram illustrating an overview of preceding-vehicle tracking steering control.

FIG. 3 and FIG. 4 are diagrams each illustrating an overview of preceding-vehicle tracking steering control. FIG. 3 illustrates an example where the vehicle 100 and the preceding vehicle 200 are traveling in a straight line. FIG. 4 illustrates an example where the vehicle 100 and the preceding vehicle 200 are traveling in a curve with a constant radius of curvature.

As illustrated in FIG. 3 and FIG. 4, the driving assistance controller 5 acquires information representing the position (X, Z) of the preceding vehicle 200 in the XZ coordinate system, with respect to the origin O, and retained in the memory 4 as a result of image processing performed by the image processor 3. The origin O, described above, is a predetermined position of the vehicle 100.

For example, the origin O is set at the center of the vehicle 100 in the lateral direction (right and left direction) and at the leading end of the vehicle 100 in the direction of travel. In the XZ coordinate system, the X-axis direction is along the lateral direction of the vehicle 100, where the rightward direction is considered positive, and the Z-axis direction is along the forward and rearward direction of the vehicle 100, where the forward direction is considered positive.

The driving assistance controller 5 sets the acquired position of the preceding vehicle 200 as a control target point and calculates a curvature k using equation (1).

$$k = \frac{2X}{X^2 + Z^2} \quad (1)$$

The driving assistance controller 5 instructs the steering controller 10 to cause the vehicle 100 to travel in a curve with the calculated curvature k. That is, the driving assistance controller 5 causes the steering controller 10 to perform steering control which drives the steering-related actuator 15 in such a way that the vehicle 100 travels in a curve with the calculated curvature k.

When the vehicle 100 and the preceding vehicle 200 are traveling in a straight line as illustrated in FIG. 3, the curvature k in equation (1) is substantially zero. Accordingly, the driving assistance controller 5 causes steering control to be performed in such a way that the vehicle 100 travels substantially in a straight line. This enables the vehicle 100 to track the preceding vehicle 200 while traveling in a straight line.

When the vehicle 100 and the preceding vehicle 200 are traveling in a curve with a constant radius of curvature as illustrated in FIG. 4, the driving assistance controller 5 causes steering control to be performed in such a way that the vehicle 100 travels in a curve with the curvature k, which is the reciprocal of the constant radius of curvature. This enables the vehicle 100 to track the preceding vehicle 200 while traveling in a curve with a constant radius of curvature.

Figure 5:
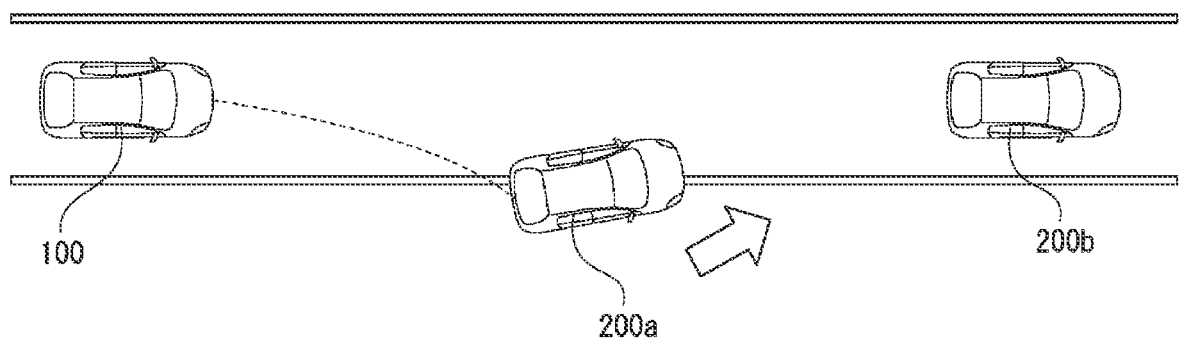
FIG. 5 is a diagram illustrating preceding-vehicle tracking steering control performed when a preceding vehicle is traveling in a curve.

FIG. 5 is a diagram illustrating preceding-vehicle tracking steering control performed when switching of the preceding vehicle 200 takes place.

Assume that during execution of preceding-vehicle tracking steering control under which the preceding vehicle 200 is being tracked, a vehicle cuts in between the vehicle 100 and the preceding vehicle 200. In this case, the image processor 3 recognizes the cutting-in vehicle as a new preceding vehicle 200.

In the following description, the new preceding vehicle 200 will be referred to as a new preceding vehicle 200a, and the preceding vehicle 200 that has been tracked before recognition of the new preceding vehicle 200a will be referred to as a previous preceding vehicle 200b. This change of the preceding vehicle 200 from the previous preceding vehicle 200b to the new preceding vehicle 200a refers to switching of the preceding vehicle 200.

When the new preceding vehicle 200a is recognized, if the curvature k is calculated on the basis of equation (1) and steering control is performed in such a way that the vehicle 100 travels in a curve with the calculated curvature k, the vehicle 100 may be turned to approach the new preceding vehicle 200a as indicated by a broken line in FIG. 5, and the behavior of the vehicle 100 may become unstable.

Accordingly, in the preceding-vehicle tracking steering control according to the embodiment, a control target point is set in such a way that when switching of the preceding vehicle 200 takes place, the object to be tracked is switched stepwise from the pre-switching preceding vehicle 200 (preceding vehicle 200b) to the post-switching preceding vehicle 200 (new preceding vehicle 200a), and steering control is performed in such a way that the vehicle 100 tracks the set control target point.

Figure 6:
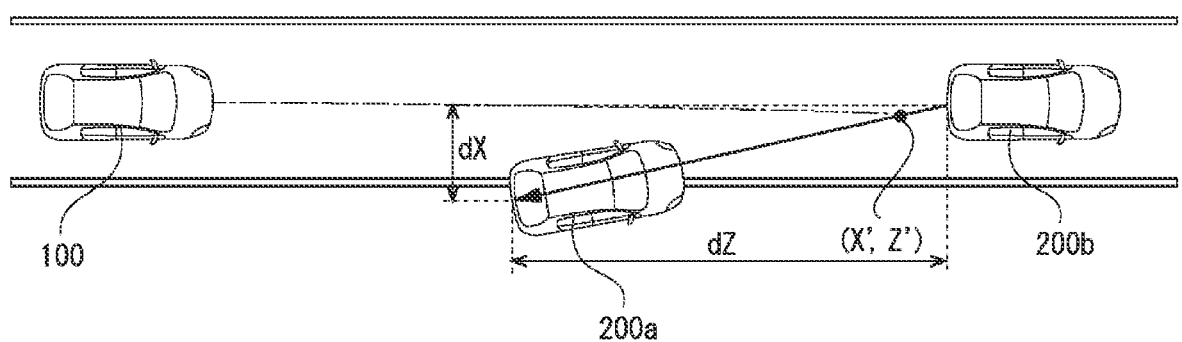
FIG. 6 is a diagram illustrating preceding-vehicle tracking steering control according to the embodiment.

FIG. 6 is a diagram illustrating preceding-vehicle tracking steering control according to the embodiment. For example, the driving assistance controller 5 acquires, from the memory 4, information representing the position (X, Z) of the preceding vehicle 200. The driving assistance controller 5 also acquires an object ID of the preceding vehicle 200. The object ID is an ID uniquely assigned to a three-dimensional object recognized by the image processor 3.

On the basis of the object ID of the preceding vehicle 200, the driving assistance controller 5 determines whether the preceding vehicle 200 has been switched. If the preceding vehicle 200 has been switched, the driving assistance controller 5 calculates a difference (dX, dZ) between the new preceding vehicle 200a and the previous preceding vehicle 200b in the X-axis direction and the Z-axis direction, on the basis of the first position (X, Z) of the new preceding vehicle 200a acquired this time and the last position (X, Z) of the previous preceding vehicle 200b acquired the previous time.

For example, the driving assistance controller 5 calculates the difference (dX, dZ) by subtracting the first position (X, Z) of the new preceding vehicle 200a from the last position (X, Z) of the previous preceding vehicle 200b. The difference (dX, dZ) calculated here is the difference immediately after switching of the preceding vehicle 200. As indicated by an arrowed line in FIG. 6, the difference (dX, dZ) is shortened by subtraction every time the preceding-vehicle tracking steering control is performed.

The driving assistance controller 5 divides the distance to (or position of) the previous preceding vehicle 200b in the Z-axis direction by the speed of the vehicle 100 to calculate an inter-vehicle time taken to travel the distance to the previous preceding vehicle 200b.

Next, on the basis of the calculated inter-vehicle time, the driving assistance controller 5 calculates an asymptotic time by referring to an asymptotic time map stored in the memory 4. The asymptotic time map gives an asymptotic time associated with the inter-vehicle time. The asymptotic time is a time for switching the object to be tracked from the previous preceding vehicle 200b to the new preceding vehicle 200a. The asymptotic time is set to be shorter for a longer inter-vehicle time.

The driving assistance controller 5 calculates the number of times of execution of preceding-vehicle tracking steering control (asymptotic time/processing time) corresponding to the asymptotic time, and divides the difference (dX, dZ) by the number of times of execution to calculate a subtraction quantity (sX, sZ) for subtraction from the difference (dX, dZ) for every execution of the preceding-vehicle tracking steering control.

Then, the driving assistance controller 5 subtracts the subtraction quantity (sX, sZ) from the difference (dX, dZ) to reduce the difference (dX, dZ) in every execution of the preceding-vehicle tracking steering control. With this calculation, the difference (dX, dZ) is linearly reduced by the subtraction quantity (sX, sZ) every time the preceding-vehicle tracking steering control is executed. The difference (dX, dZ) reaches zero when the preceding-vehicle tracking steering control is executed the number of times of execution.

The driving assistance controller 5 then sets, as a control target point (X', Z'), a position obtained by adding the difference (dX, dZ) to the position (X, Z) of the new preceding vehicle 200a acquired this time. That is, the driving assistance controller 5 sets the control target point in such a way that the difference (dX, dZ) between the positions before and after switching of the preceding vehicle 200 gradually approaches zero.

As indicated by a filled circle in FIG. 6, the control target point (X', Z') is set in such a way that the object to be tracked is switched stepwise from the previous preceding vehicle 200b to the new preceding vehicle 200a over the asymptotic time, with respect to the time point at which the preceding vehicle 200 to be controlled has been switched.

Then, the driving assistance controller 5 calculates the curvature k by substituting the control target point (X', Z') into X and Z in equation (1). The driving assistance controller 5 causes the steering controller 10 to perform steering control that drives the steering-related actuator 15 in such a way that the vehicle 100 travels in a curve with the curvature k, as indicated by an alternate long and short dash line in FIG. 6.

Thus, even when the preceding vehicle 200 is switched, the position of the new preceding vehicle 200a is not immediately set as the control target point. That is, the control target point is gradually shifted from the position of the previous preceding vehicle 200b to the position of the new preceding vehicle 200a.

The driving assistance controller 5 can thus reduce unstable behavior of the vehicle 100, such as abrupt turning of the vehicle 100 that is traveling in a straight line.

Figure 7:
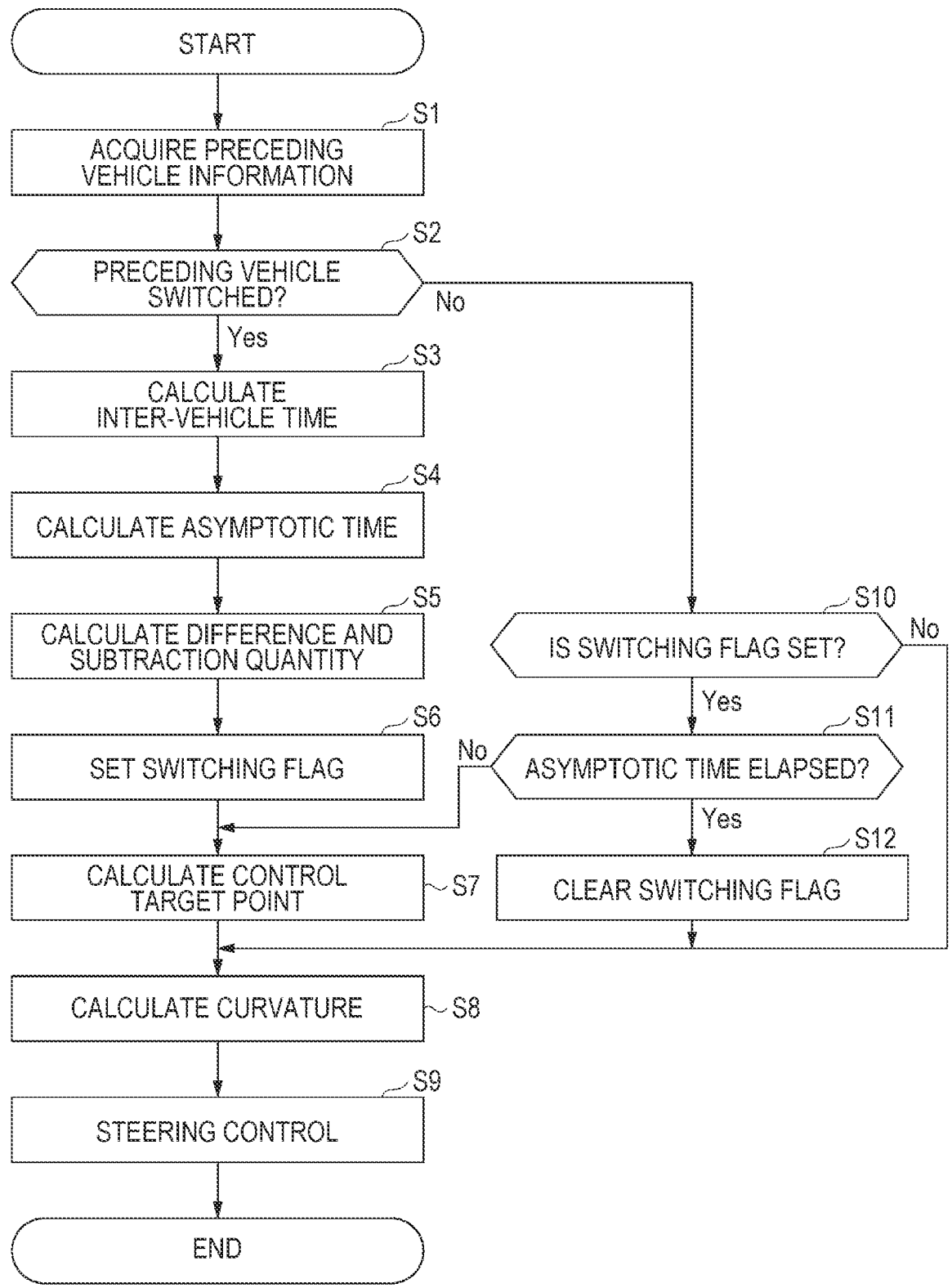
FIG. 7 is a flowchart illustrating a process of preceding-vehicle tracking steering control according to the embodiment.

FIG. 7 is a flowchart illustrating a process of preceding-vehicle tracking steering control. When the preceding-vehicle tracking steering control starts, as illustrated in FIG. 7, the driving assistance controller 5 acquires information about the preceding vehicle 200 from the memory 4 in step S1. For example, the driving assistance controller 5 acquires the position of the preceding vehicle 200 and the object ID of the preceding vehicle 200.

In step S2, the driving assistance controller 5 determines whether the preceding vehicle 200 has been switched. If the preceding vehicle 200 has been switched (Yes in step S2), the driving assistance controller 5 calculates an inter-vehicle time in step S3, calculates an asymptotic time in step S4, and calculates the difference (dX, dZ) and the subtraction quantity (sX, sZ) in step S5. In step S6, the driving assistance controller 5 sets a switching flag indicating that the preceding vehicle 200 to be controlled is in the process of being switched.

In step S7, the driving assistance controller 5 subtracts a subtraction quantity from the difference (dX, dZ) and calculates a control target point (X', Z') by adding the resulting difference (dX, dZ) to the position of the new preceding vehicle 200a. In step S8, the driving assistance controller 5 calculates the curvature k by substituting the control target point (X', Z') into X and Z in equation (1). In step S9, the driving assistance controller 5 causes the steering controller 10 to perform steering control that drives the steering-related actuator 15 in such a way that the vehicle 100 travels in a curve with the curvature k.

On the other hand, if the preceding vehicle 200 has not been switched (No in step S2), the driving assistance controller 5 determines, in step S10, whether a switching flag is set. If a switching flag is not set (No in step S10), the process proceeds to step S8. In this case, the driving assistance controller 5 substitutes the position (X, Z) of the preceding vehicle 200 as the control target point into equation (1) to calculate the curvature k.

If a switching flag is set (Yes in step S10), the driving assistance controller 5 determines, in step S11, whether the asymptotic time has elapsed. If the asymptotic time has not elapsed (No in step S11), the process proceeds to step S7. If the asymptotic time has elapsed (Yes in step S11), the driving assistance controller 5 clears the switching flag in step S12 and moves to step S8.

The embodiments described above are examples for carrying out the disclosure. Embodiments of the disclosure are not limited to the examples described above, and various modifications are possible.

For example, in the preceding-vehicle tracking steering control according to the embodiments described above, the asymptotic time is calculated on the basis of the inter-vehicle time. Alternatively, the asymptotic time may be calculated on the basis of the distance to the previous preceding vehicle 200b (inter-vehicle distance). In this case, a shorter asymptotic time is simply set for a longer inter-vehicle distance.

A program that causes a computer to execute the process illustrated in FIG. 7 can be stored in a storage medium, such as a nonvolatile memory in the driving assistance controller 5 or a nonvolatile memory in the traveling control apparatus 1. The program may be stored in a portable storage medium, or may be downloaded from a server through a network communication onto the vehicle 100.

Although the image processor 3, the driving assistance controller 5, the display controller 6, the engine controller 7, the transmission controller 8, the brake controller 9, and the steering controller 10 described above are constituted by different microcomputers, they may be constituted by a single microcomputer. Some of the image processor 3, the driving assistance controller 5, the display controller 6, the engine controller 7, the transmission controller 8, the brake controller 9, and the steering controller 10 may be constituted by a single microcomputer.

As described above, the traveling control apparatus 1 according to the embodiments includes the driving assistance controller 5. The driving assistance controller 5 is configured to set the control target point (X', Z') in such a way that when switching of the preceding vehicle 200 takes place, an object to be tracked is switched stepwise from a pre-switching preceding vehicle (previous preceding vehicle 200b) to a post-switching preceding vehicle (new preceding vehicle 200a). The driving assistance controller 5 is configured to cause steering control to be performed in such a way that the vehicle 100 tracks the set control target point.

The traveling control apparatus 1 thus enables steering control to be performed in such a way that an object to be controlled is gradually shifted from the pre-switching preceding vehicle to the post-switching preceding vehicle.

The traveling control apparatus 1 can thus stabilize the behavior of the vehicle 100.

The driving assistance controller 5 may be configured to set the control target point (X', Z') by adding the difference (dX, dZ) between the position of the pre-switching preceding vehicle (previous preceding vehicle 200b) and the position of the post-switching preceding vehicle (new preceding vehicle 200a) to the position of the post-switching preceding vehicle (new preceding vehicle 200a), and gradually bring the difference close to zero.

This allows the control target point (X', Z') to be gradually shifted from the position of the previous preceding vehicle 200b toward the position of the new preceding vehicle 200a and can further stabilize the behavior of the vehicle 100.

The driving assistance controller 5 may be configured to calculate an asymptotic time for making the difference (dX, dZ) zero, on the basis of an inter-vehicle time taken by the vehicle 100 to travel an inter-vehicle distance to the pre-switching preceding vehicle (previous preceding vehicle 200b), and gradually bring the difference close to zero over the calculated asymptotic time.

This makes it possible to set the optimal asymptotic time for the inter-vehicle time, and to gradually bring the difference close to zero over the asymptotic time that varies depending on the inter-vehicle time. That is, the object to be tracked can be shifted optimally in accordance with the inter-vehicle time, and the behavior of the vehicle 100 can be further stabilized.

The asymptotic time may decrease as the inter-vehicle time increases.

When the inter-vehicle time or the inter-vehicle distance is long, a cutting-in vehicle (new preceding vehicle 200a) can cut in without taking much time. On the other hand, when the inter-vehicle time or the inter-vehicle distance is short, a cutting-in vehicle (new preceding vehicle 200a) slowly cuts in over time.

Therefore, by making the asymptotic time shorter for a longer inter-vehicle time, the asymptotic time can be set in accordance with the behavior of the cutting-in vehicle. That is, it is possible to shift the object to be tracked optimally in accordance with the behavior of the cutting-in vehicle and further stabilize the behavior of the vehicle 100.

The driving assistance controller 5 may calculate the asymptotic time for making the difference zero, on the basis of the inter-vehicle distance to the pre-switching preceding vehicle (previous preceding vehicle 200b), and gradually bring the difference close to zero over the calculated asymptotic time.

This makes it possible to set the optimal asymptotic time for the inter-vehicle distance, and to gradually bring the difference close to zero over the asymptotic time that varies depending on the inter-vehicle distance. That is, the object to be tracked can be shifted optimally in accordance with the inter-vehicle distance, and the behavior of the vehicle 100 can be further stabilized.

The invention claimed is:

1. A traveling control apparatus applied to a vehicle, the traveling control apparatus comprising at least one processor, wherein
the at least one processor is configured to function as a driving assistance controller, and
the driving assistance controller is configured to, in response to a preceding vehicle traveling ahead of the vehicle changes from a pre-switching preceding vehicle to a post-switching preceding vehicle, (i) determine a distance between a position of the pre-switching preceding vehicle and a position of the post-switching preceding vehicle, and (ii) execute a switching process for switching an object to be tracked by the vehicle stepwise from the pre-switching preceding vehicle to the post-switching preceding vehicle, wherein during the switching process the driving assistance controller is configured to:

determine a plurality of control target points set between the pre-switching preceding vehicle and the post-switching preceding vehicle in a traveling path of the vehicle by;
setting a first control target point of the plurality of control target points by adding a first difference to the position of the post-switching preceding vehicle based on the determined distance;
switching the object to be tracked by the vehicle from the pre-switching preceding vehicle to the first control target point and cause steering control to be performed in such a way that the vehicle tracks the first control target point,
for remaining control target points of the plurality of control target points, repeat the setting for each corresponding control target point of the plurality of control target points, wherein a corresponding difference added to the position of post-switching preceding vehicle for each corresponding control target point of the plurality of control target points decreases and is closer to zero than an immediate preceding control target point of the plurality of control target points,
wherein, in response to the plurality of control target points being set, the object to be tracked by the vehicle is switched from the immediate preceding control target point to an immediate next control target point, and the steering control is caused to be performed in such a way that the vehicle tracks each control target point of the plurality of control target points,
wherein the driving assistance controller is configured to calculate an asymptotic time for making the determined distance zero, on a basis of an inter-vehicle time taken by the vehicle to travel an inter-vehicle distance to the pre-switching preceding vehicle, and
wherein the asymptotic time decreases as the inter-vehicle time increases.

2. The traveling control apparatus according to claim 1, wherein the driving assistance controller is configured to calculate the inter-vehicle time based on the position of the pre-switching preceding vehicle and a speed of the vehicle.

3. The traveling control apparatus according to claim 1, wherein the driving assistance controller is configured to iteratively calculate the inter-vehicle time and the asymptotic time such that at each time repeating the set of the plurality of control target point, the difference is reduced as compared to a previous calculation.

4. The traveling control apparatus according to claim 1, wherein the driving assistance controller is configured to
in response to the difference being reduced to zero, set the position of the post-switching preceding vehicle as the control target point.

5. The traveling control apparatus according to claim 1, wherein the driving assistance controller is configured to calculate the asymptotic time based on a behavior of the post-switching preceding vehicle.

6. The traveling control apparatus according to claim 1, wherein the first difference and the corresponding difference for the plurality of control target points are calculated by dividing the distance between the position of the pre-switching preceding vehicle and the position of the post-switching preceding vehicle by a number of the plurality of control target points.

7. The traveling control apparatus according to claim 1, wherein the corresponding difference for the plurality of control target points decreases evenly among the plurality of control target points.

8. The traveling control apparatus according to claim 1, wherein a number of the plurality of control target points is determined based on the asymptotic time.

\* \* \* \* \*